United States Patent
Kawagoe et al.

(10) Patent No.: US 10,800,212 B2
(45) Date of Patent: Oct. 13, 2020

(54) PNEUMATIC TIRE

(71) Applicant: Sumitomo Rubber Industries, Ltd., Kobe-shi, Hyogo (JP)

(72) Inventors: Yoshifumi Kawagoe, Kobe (JP); Masashi Wakasugi, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 201 days.

(21) Appl. No.: 15/626,982

(22) Filed: Jun. 19, 2017

(65) Prior Publication Data

US 2018/0009269 A1 Jan. 11, 2018

(30) Foreign Application Priority Data

Jul. 11, 2016 (JP) .................................. 2016-137095

(51) Int. Cl.
*B60C 11/12* (2006.01)
*B60C 11/03* (2006.01)

(52) U.S. Cl.
CPC ...... *B60C 11/1236* (2013.01); *B60C 11/0304* (2013.01); *B60C 11/0306* (2013.01); *B60C 11/125* (2013.01); *B60C 11/1259* (2013.01); *B60C 11/1263* (2013.01); *B60C 11/1204* (2013.01); *B60C 2011/0369* (2013.01); *B60C 2011/0372* (2013.01);
(Continued)

(58) Field of Classification Search
CPC .......................... B60C 11/1236; B60C 11/1204
See application file for complete search history.

(56) References Cited

U.S. PATENT DOCUMENTS 5,851,322 A * 12/1998 Hayashi .............. B60C 11/0302
152/209.2
9,038,680 B2 * 5/2015 Matsushita ......... B60C 11/1392
152/209.18
(Continued)

FOREIGN PATENT DOCUMENTS

JP           3898267 B2    3/2007
JP        2015-157600 A    9/2015
(Continued)

OTHER PUBLICATIONS

Extended European Search Report dated Nov. 9, 2017, for European Application No. 17177282.5.

*Primary Examiner* — Timothy Kennedy
*Assistant Examiner* — Alexander A Wang
(74) *Attorney, Agent, or Firm* — Birch, Stewart, Kolasch & Birch, LLP

(57) ABSTRACT

A pneumatic tire includes a first tread-half region from the tire equator to a first tread edge. In the first tread-half region, a crown land portion and a middle land portion are not provided with any grooves having widths equal to or more than 2 mm. In the first tread-half region, crown, middle and shoulder portions are respectively provided with a first crown sipe, a first middle sipe and a first shoulder sipe each having a width less than 2 mm. The first crown sipe, the first middle sipe and the first shoulder sipe are respectively configured as arc shapes having radiuses R1, R2 and R3 of curvature to protrude in a first circumferential direction side, wherein the radiuses R1, R2 and R3 are satisfied the following relation: R1<=R2<=R3, and R1<R3.

19 Claims, 6 Drawing Sheets

(52) U.S. Cl.
CPC .............. *B60C 2011/0381* (2013.01); *B60C 2011/0388* (2013.01); *B60C 2011/1209* (2013.01)

(56) References Cited

U.S. PATENT DOCUMENTS

| | | | |
|---|---|---|---|
| 10,207,545 B2 * | 2/2019 | Kishida | ................ B60C 11/042 |
| 2012/0261045 A1 | 10/2012 | Matsushita | |
| 2013/0167997 A1 * | 7/2013 | Hayashi | ................ B60C 11/04 |
| | | | 152/209.18 |
| 2014/0305559 A1 * | 10/2014 | Takemoto | ........... B60C 11/0304 |
| | | | 152/209.8 |
| 2014/0305563 A1 * | 10/2014 | Kujime | ............... B60C 11/1204 |
| | | | 152/209.18 |
| 2015/0041034 A1 | 2/2015 | Matsushita | |
| 2018/0079260 A1 * | 3/2018 | Suzuki | ................ B60C 11/0302 |
| 2018/0126790 A1 * | 5/2018 | Muhlhoff | ............ B60C 11/0306 |

FOREIGN PATENT DOCUMENTS

| | | | | |
|---|---|---|---|---|
| JP | 2016-22800 A | 2/2016 | | |
| WO | WO-2015025670 A1 * | 2/2015 | ......... | B60C 11/1353 |
| WO | WO-2016163207 A1 * | 10/2016 | ......... | B60C 11/0302 |

\* cited by examiner

PNEUMATIC TIRE

BACKGROUND ART

Field of the Invention

The present invention relates to pneumatic tires, and more particularly to a pneumatic tire capable of improving uneven wear resistance as well as wet performance.

Description of the Related Art

Conventionally, in order to improve steering stability, a pneumatic tire which includes a tread portion provided with a circumferentially and continuously extending crown main grooves on the tire equator and a pair of shoulder main grooves each arranged axially outside the crown main groove to form a pair of middle land portions has been proposed by Japanese Unexamined Patent Application Publication JP2015-157600A1. In the pneumatic tire, since the middle land portions of the tread portion are not provided with grooves that have large widths, rigidity of the middle land portions may be ensured to improve the steering stability.

Unfortunately, regarding the above pneumatic tire, drainage performance of the tread portion may be deteriorated due to a configuration of a certain combination of three main grooves and middle sipes, and therefore it may be difficult to improve wet performance sufficiently. On the other hand, when grooves having large widths are provided on the middle land portions to improve the wet performance, uneven wear occurs on the groove edges, and thus uneven wear resistance of the tire may be deteriorated.

SUMMARY OF THE INVENTION

In view of the above problems in the conventional art, the present invention has a primary object to provide a pneumatic tire that may deliver outstanding uneven wear resistance and wet performance.

In one aspect of the invention, a pneumatic tire includes a tread portion provided with a pair of circumferentially and continuously extending crown main grooves arranged such that a tire equator is located therebetween, a pair of circumferentially and continuously shoulder main grooves arranged such that the crown main grooves are located therebetween, a crown land portion disposed between the crown main grooves, a pair of middle land portions each disposed between adjacent one of the crown main grooves and one of the shoulder main grooves on each side of the tire equator, and a pair of shoulder land portions disposed axially outward of the shoulder main grooves, wherein the tread portion comprises a first tread-half region from the tire equator to a first tread edge. In the first tread-half region, the crown land portion and the middle land portion are not provided with any grooves having widths equal to or more than 2 mm. In the first tread-half region, the crown land portion, the middle land portion and the shoulder land portion are respectively provided with a first crown sipe, a first middle sipe and a first shoulder sipe each having a width less than 2 mm. The first crown sipe, the first middle sipe and the first shoulder sipe are respectively configured as arc shapes having radiuses $R1$, $R2$ and $R3$ of curvature to protrude in a first circumferential direction side, wherein the radiuses $R1$, $R2$ and $R3$ are satisfied the following relation:

$$R1 <= R2 <= R3, \text{ and } R1 < R3.$$

In another aspect of the invention, the first crown sipe may be arranged so as to be continuous smoothly to the first middle sipe through the crown main groove on the first tread-half region, and the first middle sipe may be arranged so as to be continuous smoothly to the first shoulder sipe through the shoulder main groove on the first tread-half region.

In another aspect of the invention, the first crown sipe may extend from the crown main groove on the first tread-half region beyond the tire equator and may terminate without reaching the other one of the crown main grooves.

In another aspect of the invention, respective lengths $L1$, $L2$ and $L3$ of the first crown sipe, the first middle sipe and the first shoulder sipe may be satisfied the following relation:

$$L1 < L2 < L3.$$

In another aspect of the invention, the tread portion may include a second tread-half region from the tire equator to a second tread edge located on an opposite side of the first tread edge, in the second tread-half region, the crown land portion may be provided with a second crown sipe having a width less than 2 mm, and the second crown sipe may extend from the crown main groove on the second tread-half region and may terminate without reaching the tire equator.

In another aspect of the invention, in the second tread-half region, the middle land portion and the shoulder land portion may be respectively provided with a second middle sipe and a second shoulder sipe each having a width less than 2 mm, and the second middle sipe and the second shoulder sipe may be respectively configured as arc shapes having radiuses $R4$ and $R5$ of curvature to protrude in a second circumferential direction side, wherein the radiuses $R4$ and $R5$ may be satisfied the following relation:

$$R4 <= R5.$$

In another aspect of the invention, the second crown sipe may be arranged so as to be continuous smoothly to the second middle sipe through the crown main groove on the second tread-half region, and the second middle sipe may be arranged so as to be continuous smoothly to the second shoulder sipe through the shoulder main groove on the second tread-half region.

In another aspect of the invention, the second shoulder sipe may extend from the shoulder main groove and terminates without reaching the second tread edge.

In another aspect of the invention, in the first tread-half region, the shoulder land portion may be provided with a first shoulder lug groove extending axially inwardly from the first tread edge and terminating without reaching the shoulder main groove, and the first shoulder lug groove may include a straight portion extending in a straight manner from the first tread edge at an angle of 85 to 95 degrees with respect to a tire circumferential direction and a curved portion extending in an arc manner along the first shoulder sipe.

In another aspect of the invention, in the second tread-half region, the shoulder land portion may be provided with a second shoulder lug groove extending axially inwardly from the second tread edge and terminating without reaching the shoulder main groove, and the second shoulder lug groove may include a straight portion extending in a straight manner from the second tread edge at an angle of 85 to 95 degrees with respect to a tire circumferential direction and a curved portion extending in an arc manner along the second shoulder sipe.

In another aspect of the invention, a length L1 of the first crown sipe may be in a range of from 70% to 100% of a width of the crown main groove on the first tread-half region.

DESCRIPTION OF THE PREFERRED EMBODIMENTS

An embodiment of the present invention will be explained below with reference to the accompanying drawings.

Figure 1:
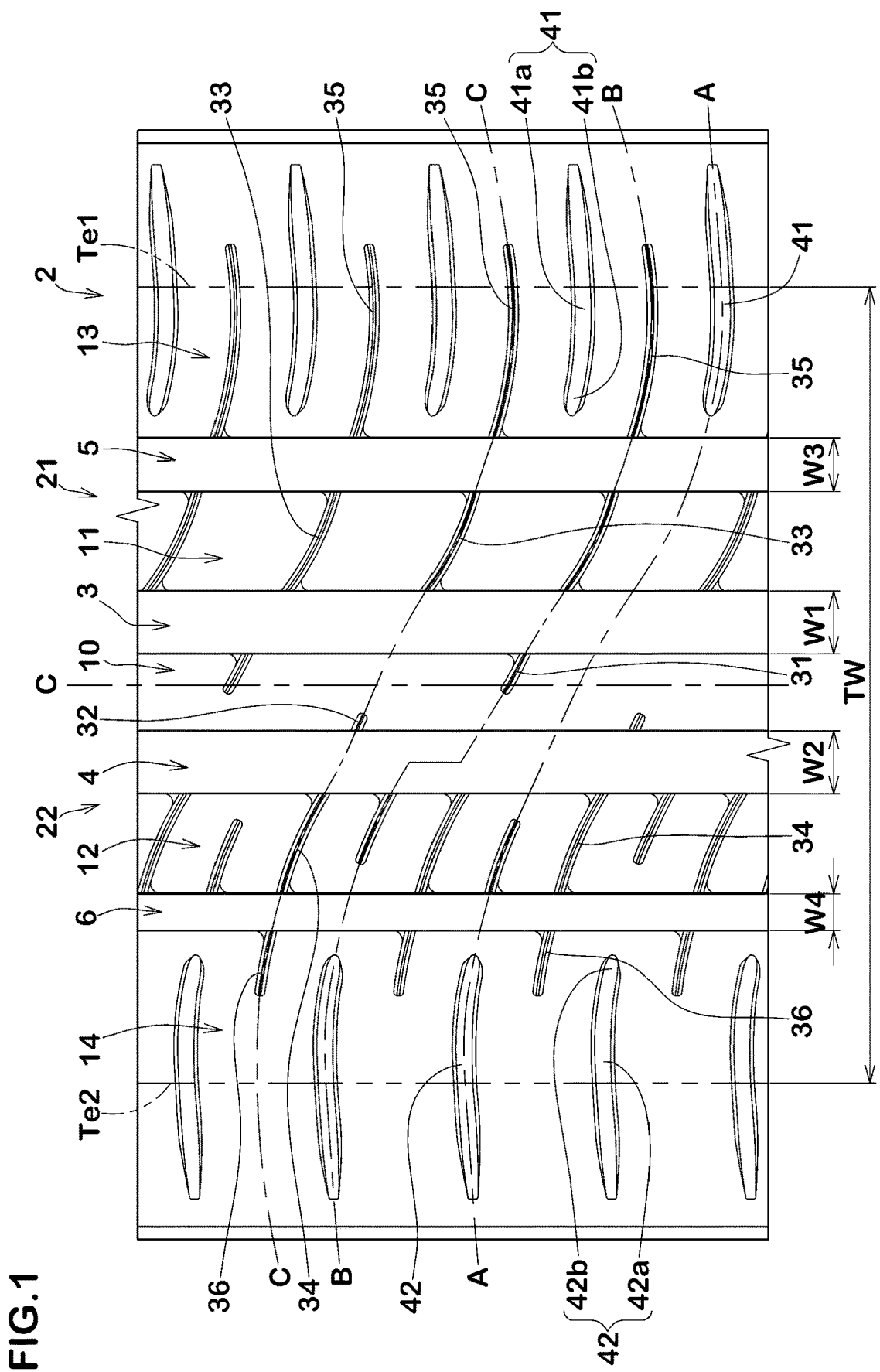
FIG. 1 is a development view of a tread portion of a pneumatic tire according to an embodiment of the present invention.
Figure 2:
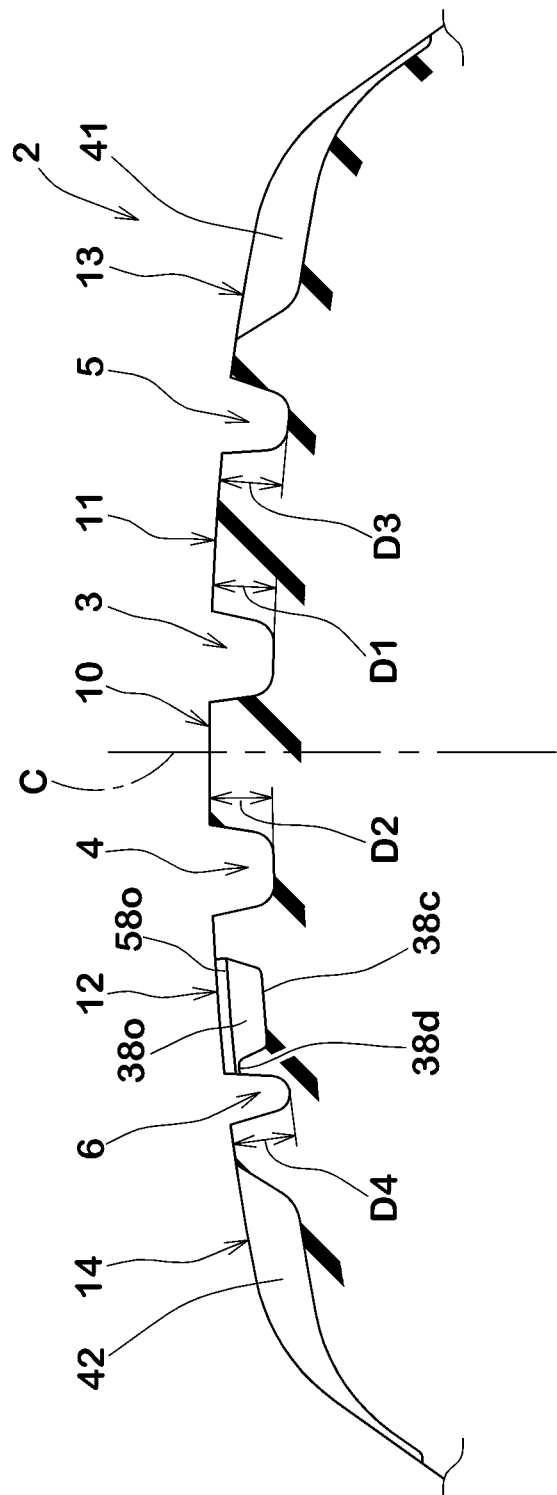
FIG. 2 is a sectional view of the tread portion taken along a line A-A of FIG. 1.

FIG. 1 illustrates a development view of a tread portion 2 of a pneumatic tire (the entire tire is not shown) according to an embodiment of the present invention. FIG. 2 illustrates a sectional view of the tread portion 2 taken along a line A-A of FIG. 1. The pneumatic tire in accordance with the present embodiment, for example, may be suitably embodied as a pneumatic tire for passenger car, and includes an asymmetrical tread pattern having a designated mounting direction to a vehicle. The designated mounting direction to a vehicle, for example, is indicated on a sidewall portion of the tire (not illustrated) using character and the like.

As illustrated in FIG. 1, in the pneumatic tire in accordance with the present embodiment, the tread portion 2 is provided with a pair of circumferentially and continuously extending crown main grooves 3 and 4, and a pair of circumferentially and continuously extending shoulder main grooves 5 and 6. The crown main grooves 3 and 4 are arranged axially both sides of the tire equator C. The shoulder main groove 5 is arranged axially outward of the crown main groove 3, and the shoulder main groove 6 is arranged axially outward of the crown main groove 4. In this embodiment, the crown main grooves 3 and 4 and the shoulder main grooves 5 and 6 extend straightly over the tire circumference. The crown main grooves 3, 4 and the shoulder main grooves 5, 6 as such may deliver excellent drainage performance and thus improve wet performance of the pneumatic tire.

The respective widths W1 and W2 of the crown main grooves 3 and 4, and the respective widths W3 and W4 of the shoulder main grooves 5 and 6 may be specified according to a usual practice. For example, in a pneumatic tire for passenger car according to the embodiment, the widths W1, W2, W3 and W4 are preferably in a range of from 4.0% to 8.5% of the tread ground contact width TW. When the widths W1, W2, W3 and W4 are less than 4.0% of the tread ground contact width TW, the drainage performance may be affected. On the other hand, when the widths W1, W2, W3 and W4 are greater than 8.5% of the tread ground contact width TW, uneven wear resistance of the tire may be affected due to reduction in rubber volume of the tread portion 2.

As used herein, the tread ground contact width TW is the axial distance between tread edges Te1 and Te2 of the tread portion 2 when the tire under a standard condition is grounded on a plane with a standard tire load at the camber angle of zero.

As used herein, the tread edges Te1 and Te2 refer to axially outermost edges of the ground contacting patch of the tread portion 2 which occurs under a condition where the tire under the standard condition is grounded on a plane with a standard tire load at the camber angle of zero. As used herein, the standard condition is such that the tire is mounted on a standard wheel rim (not illustrated) with a standard pressure, but is loaded with no tire load. In this application including specification and claims, various dimensions, positions and the like of the tire refer to those under the standard condition of the tire unless otherwise noted.

As used herein, the standard wheel rim is a wheel rim officially approved for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example. In case that the tire is for passenger cars, the standard pressure is defined as 180 kPa uniformly.

As used herein, the standard tire load is a tire load officially approved for the tire by standards organizations, wherein the standard tire load is the "maximum load capacity" in JATMA, the "Load Capacity" in ETRTO, and the maximum value given in the above-mentioned table in TRA or the like. In case that the tire is for passenger cars, the standard tire load is defined as a load that corresponds to 88% of the above load.

As illustrated in FIG. 2, the respective depths D1 and D2 of the crown main grooves 3 and 4, and the respective depths D3 and D4 of the shoulder main grooves 5 and 6 may be specified according to a usual practice. For example, in a pneumatic tire for passenger car according to the embodiment, the depths D1, D2, D3 and D4 are preferably in a range of from 5 to 10 mm.

When the depths D1, D2, D3 and D4 are less than 5 mm, the drainage performance may be affected. On the other hand, when the depths D1, D2, D3 and D4 are greater than 10 mm, steering stability of the tire may be affected clue to reduction in rigidity of the tread portion 2.

The tread portion 2, by the crown main grooves 3 and 4 and the shoulder main grooves 5 and 6, is separated into a crown land portion 10, middle land portions 11 and 12, and shoulder land portions 13 and 14. The crown land portion 10 is disposed between the crown main grooves 3 and 4. The middle land portion 11 is disposed between the crown main groove 3 and the shoulder main groove 5, and the middle land portion 12 is disposed between the crown main grooves 4 and the shoulder main groove 6. The shoulder land portion 13 is disposed axially outside the shoulder main groove 5, and the shoulder land portion 14 is disposed axially outside the shoulder main groove 6.

The tread portion 2 includes a first tread-half region 21 from the tire equator C to one of the tread edge Te1 (hereinafter, it may refer to as a first tread edge Te1). Preferably, the pneumatic tire in accordance with the present embodiment is configured to be mounted to a vehicle in such a manner that the first tread-half region 21 is located on an inner side of the vehicle. The first tread-half region 21 includes the crown main groove 3 (hereinafter referred to as a first crown main grooves 3), the shoulder main groove 5 (hereinafter referred to as a first shoulder main groove 5), a part of the crown land portion 10, the middle land portion 11 (hereinafter referred to as a first middle land portion 11) and the shoulder land portion 13 (hereinafter referred to as a first shoulder land portion 13).

In this embodiment, in the first tread-half region 21, the crown land portion 10 and the first middle land portion 11 are not provided with any grooves having widths equal to or more than 2 mm. Accordingly, since the crown land portion 10 and the first middle land portion 11 have no groove edges that cause uneven wear, e.g., heel and toe wear, uneven wear resistance can be improved.

The crown land portion 10 is provided with a plurality of first crown sipes 31. The first crown sipes 31 extend in the tire axial direction from the first crown main groove 3 toward the tire equator C while curving in an arc manner. The widths of the first crown sipes 31 are less than 2 mm. The first crown sipes 31 as configured above may improve the wet performance using the sipe edges. Also, the first crown sipes 31 may suppress the reduction in rigidity of the crown land portion 10 since the first crown sipes 31 may close in the ground contact surface when the tire is in contact with the ground with the standard load. Consequently, uneven wear may not be caused on the sipe edges of the first crown sipes 31, and thus reduction in the uneven wear resistance can be prevented.

The first middle land portion 11 is provided with a plurality of first middle sipes 33. The first middle sipes 33 extend in the tire axial direction from the first crown main groove 3 to the first shoulder main groove 5 while curving in an arc manner. The widths of the first middle sipes 33 are less than 2 mm. The first middle sipes 33 as configured above, similar to the first crown sipes 31, may improve the wet performance using the sipe edges, and may suppress the reduction in rigidity of the first middle land portion 11 since the first middle sipes 33 may close in the ground contact surface when the tire is in contact with the ground with the standard load.

The first shoulder land portion 13 is provided with a plurality of first shoulder sipes 35. The first shoulder sipes 35 extend in the tire axial direction from the first shoulder main groove 5 toward the first tread edge Te1 while curving in an arc manner. The first shoulder sipes 35 extend axially outwardly beyond the first tread edge Te1. The first shoulder sipes 35 as such may further improve the wet performance of the pneumatic tire.

The widths of the first shoulder sipes 35 are less than 2 mm. The first shoulder sipes 35 as such, similar to the first crown sipes 31, may improve the wet performance using the sipe edges, and may suppress the reduction in rigidity of the first shoulder land portion 13 since the first shoulder sipes 35 may close in the ground contact surface when the tire is in contact with the ground with the standard load.

Figure 3:
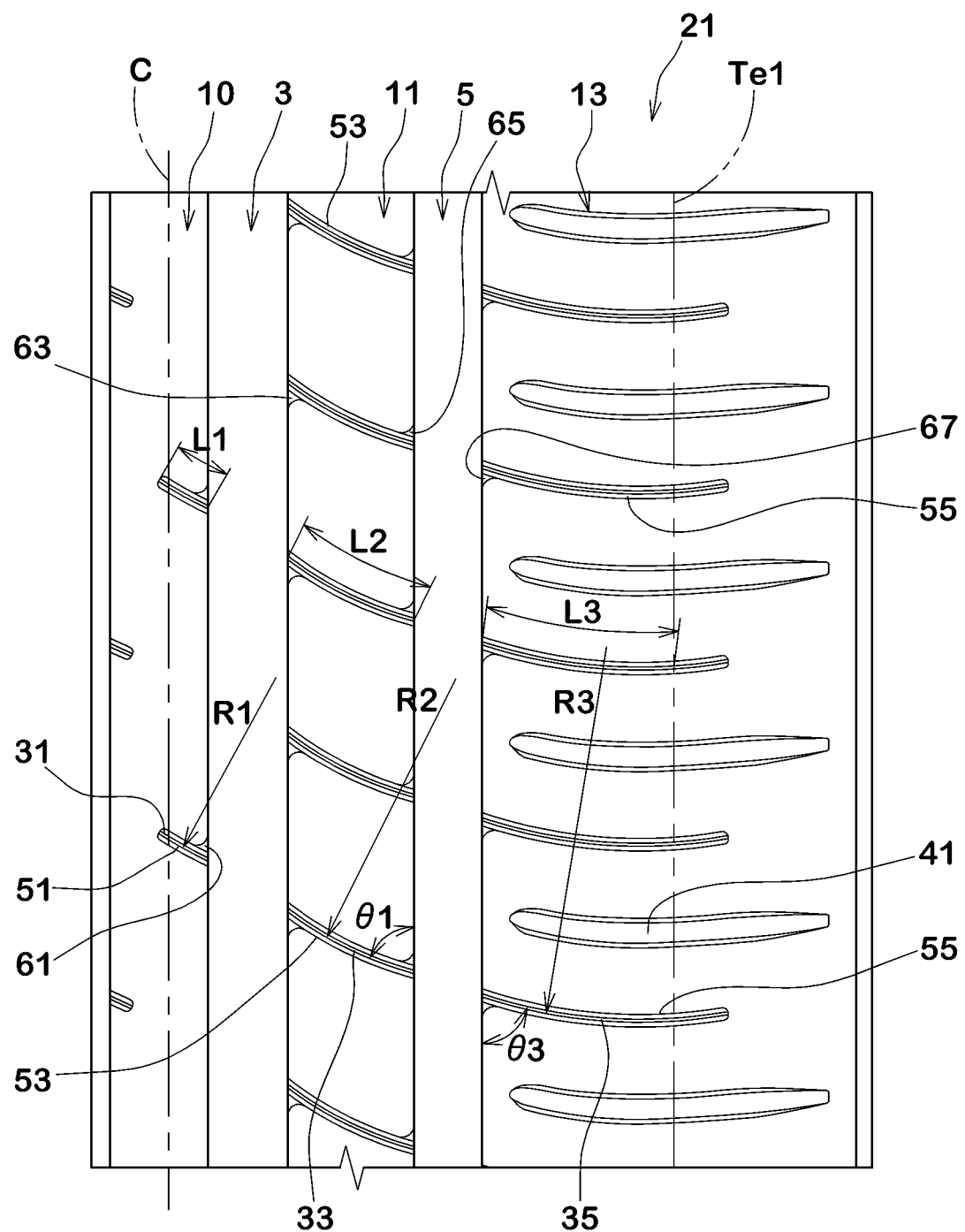
FIG. 3 is an enlarged development view of a first tread-half region of FIG. 1.

FIG. 3 illustrates the first tread-half region 21. The first crown sipes 31, the first middle sipes 33 and the first shoulder sipes 35 are respectively configured as arc shapes having radiuses R1, R2 and R3 of curvature to protrude in a first circumferential direction side, e.g., below side in FIG. 3. Furthermore, each of the first crown sipes 31, the first middle sipes 33 and the first shoulder sipes 35 has the angle that increases gradually with respect to the tire circumferential direction toward the first tread edge Te1. The first crown sipes 31, the first middle sipes 33 and the first shoulder sipes 35 as configured above may be useful to make the tread portion 2 increase in axial rigidity from the tire equator C toward the first tread edge Te1, and such a tread portion may suitably improve steering stability.

The radiuses R1, R2 and R3 of curvature are satisfied the following relation:

$R1<=R2<=R3$, and $R1<R3$.

That is, the respective radiuses R1, R2 and R3 of curvature of the sipes 31, 33 and 35 increase toward the first tread edge Te1. Accordingly, from the tire equator C toward the first tread edge Te1, reduction in torsional rigidity of the land portions 10, 11 and 13 may be suppressed and thus uneven wear, e.g., shoulder wear occurring on the first shoulder land portion 13, may be suppressed. Furthermore, steering stability of the pneumatic tire can be improved with improved transient characteristic when cornering.

The first crown sipes 31 are continuous smoothly to some of the first middle sipes 33 through the first crown main grooves 3. The first middle sipes 33 are arranged so as to be continuous smoothly to the first shoulder sipes 35 through the first shoulder main groove 5. Thus, uneven wear may further be suppressed since the rigidity and ground contact pressure of the land portions 10, 11 and 13 may be optimized, e.g., the respective rigidity of the land portions 10, 11 and 13 and the ground contact pressure thereof are distributed in a well-balanced manner. Furthermore, steering stability of the pneumatic tire can be improved with improved transient characteristic when cornering.

The first crown sipes 31 extend from the first crown main groove 3 on the first tread-half region 21 beyond the tire equator C, and terminate within the crown land portion 10 without reaching the second crown main groove 4. The first crown sipes 31 may ensure excellent edge effect using the sipe edges on the crown land portion 10 on the side of the first tread-half region 21 and suppress a reduction in rigidity of the crown land portion 10 to further improve the uneven wear resistance.

Preferably, lengths L1 of the first crown sipes 31 are in a range of from 70% to 100% of the width W1 of the first crown main groove 3. When the lengths L1 are less than 70% of the width W1, it may be difficult to improve wet performance of the tire sufficiently due to insufficient edge effect using the first crown sipes 31. On the other hand, when the length L1 are more than 100% of the width W1, the uneven wear resistance may be affected due to insufficient rigidity of the crown land portion 10.

Preferably, the lengths L1 of the first crown sipes 31 are less than 50% of the axial width of the crown land portion 10. When the lengths L1 are more than 50% of the axial width of the crown land portion 10, the uneven wear resistance may be affected due to insufficient rigidity of the crown land portion 10.

Lengths L2 of the first middle sipes 33 are greater than the lengths L1 of the first crown sipes 31, and lengths L3 of the first shoulder sipes 35 are greater than the lengths L2 of the first middle sipes 33. Due to the first crown sipes 31, the first middle sipes 33 and the first shoulder sipes 35, the respective rigidity of the crown land portion 10, the first middle land portion 11 and the first shoulder land portion 13 may be optimized so that uneven wear is further suppressed.

As illustrated in FIG. 1, the tread portion 2 further includes a second tread-half region 22 from the tire equator C to the second tread edge Te2. The second tread-half region 22 includes the second crown main grooves 4, the shoulder main grooves 6 (hereinafter, referred to as a second shoulder main groove 6), the crown land portion 10, the middle land portion 12 (hereinafter, referred to as a second middle land portion 12) and the shoulder land portion 14 (hereinafter, referred to as a second shoulder land portion 14).

Preferably, the axial width of the second middle land portion 12 is equal to or more than the axial width of the first middle land portion 11. Preferably, the axial width of the second shoulder land portion 14 is equal to or more than the axial width of the first shoulder land portion 13. This configuration may be useful to ensure sufficient rubber volume of the second middle land portions 12 and the second shoulder land portion 14, and thus improve easily uneven wear resistance thereof.

In this embodiment, in the second tread-half region 22, the crown land portion 10 and the second middle land portion 12 are not provided with any grooves that have widths equal to or more than 2 mm. Accordingly, since the crown land portion 10 and the second middle land portion 12 have no groove edges that cause uneven wear, e.g., heel and toe wear, uneven wear resistance can be improved.

The crown land portion 10 is provided with a plurality of second crown sipes 32. The second crown sipes 32 extend in the tire axial direction in a straight manner from the second crown main groove 4 toward the tire equator C with an inclination. The second crown sipes 32 may be configured to extend in an arc manner.

The second crown sipes 32 and the first crown sipes 31 are arranged alternately in the tire circumferential direction. Thus, rigidity of the crown land portion 10 may be uniformized, and uneven wear resistance of the tire can be improved. The widths of the second crown sipes 32 are less than 2 mm. The second crown sipes 32 as such, using the sipe edges similar to the first crown sipes 31, may improve wet performance. Also, the second crown sipes 32 as such may close when receiving a standard tire load to suppress reduction in rigidity of the crown land portion 10 so that the uneven wear resistance can be suppressed.

The second middle land portion 12 is provided with a plurality of second middle sipes 34. The second middle sipes 34 extend in the tire axial direction from the second crown main groove 4 to the second shoulder main groove 6 while curving in an arc manner. The widths of the second middle sipes 34 are less than 2 mm. The second middle sipes 34 as such, similar to the first crown sipes 31, may improve wet performance using the sipe edges, and may close when receiving a standard tire load to suppress reduction in rigidity of the second middle land portion 12 so that the uneven wear resistance can be suppressed.

The second shoulder land portion 14 is provided with a plurality of second shoulder sipes 36. The second shoulder sipes 36 extend in the tire axial direction from the second shoulder main groove 6 toward the second tread edge Te2 while curving in an arc manner. The second shoulder sipes 36 terminate within the second shoulder land portion 14 without reaching the second tread edge Te2. The second shoulder sipes 36 may suppress reduction in rigidity in the tire circumferential direction of the second shoulder land portion 14 to further improve uneven wear resistance.

Preferably, the widths of the second shoulder sipes 36 are less than 2 mm. The second shoulder sipes 36, similar to the first crown sipes 31, may improve wet performance using the sipe edges, and may close when receiving a standard tire load to suppress reduction in rigidity of the second shoulder land portion 14 so that the uneven wear resistance can be suppressed.

Figure 4:
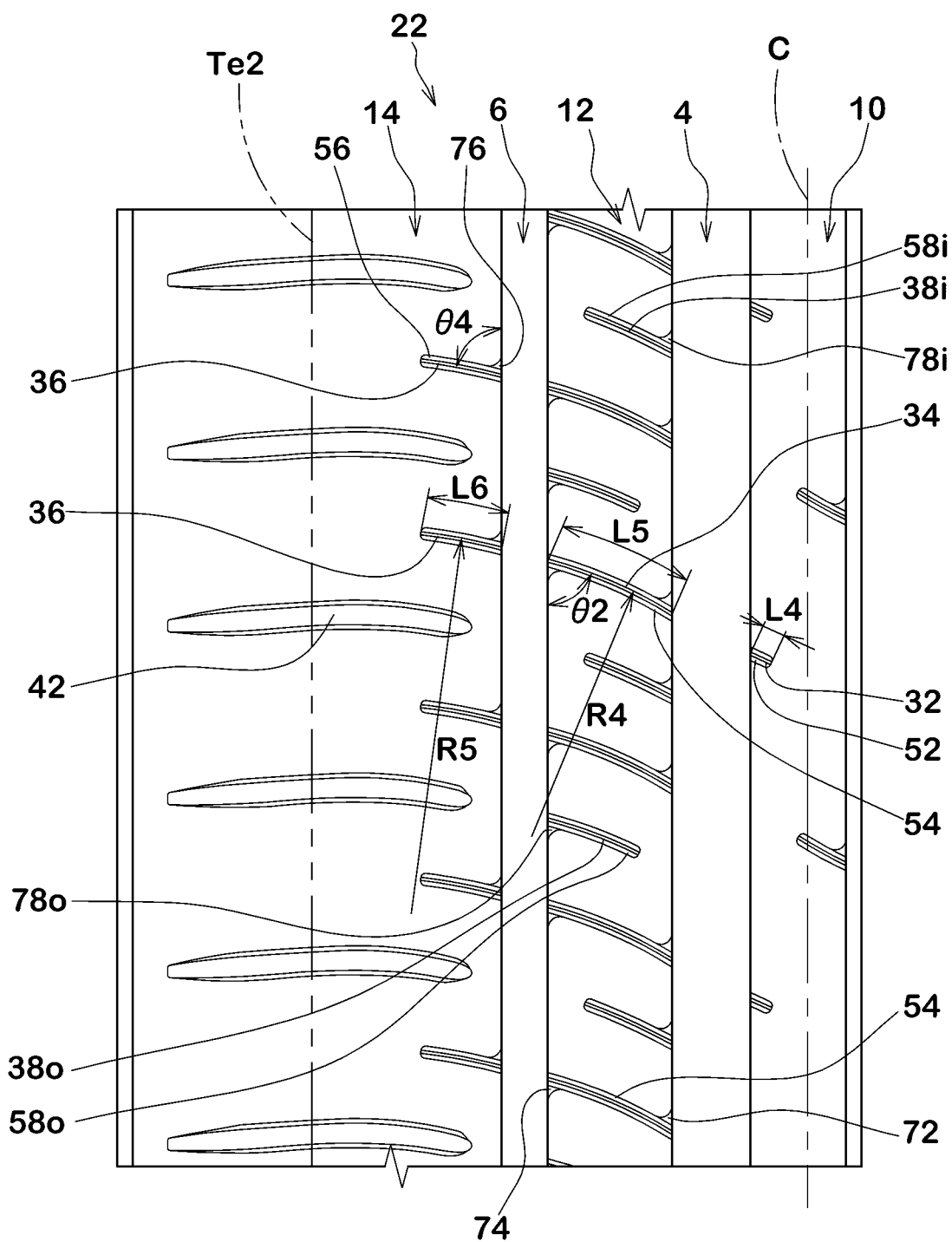
FIG. 4 is an enlarged development view of a second tread-half region of FIG. 1.

FIG. 4 illustrates the second tread-half region 22. The second middle sipes 34 and the second shoulder sipes 36 are respectively configured as arc shapes having radiuses R4 and R5 of curvature to protrude in a second circumferential direction side, e.g., the above side in FIG. 4. Furthermore, each of the second middle sipes 34 and the second shoulder sipes 36 has the angle that increases gradually with respect to the tire circumferential direction toward the second tread edge Te2. The second middle sipes 34 and the second shoulder sipes 36 as configured above may be useful to make the tread portion 2 increase in axial rigidity from the tire equator C toward the second tread edge Te2, and such a tread portion may suitably improve steering stability.

The radiuses R4 and R5 of curvature are satisfied the following relation: R4<=R5, more preferably R4<R5. Accordingly, from the tire equator C toward the second tread edge Te2, reduction in torsional rigidity of the land portions 12 and 14 may be suppressed and thus uneven wear, e.g., shoulder wear occurring on the shoulder land portion 14, may be suppressed.

One of the second crown sipes 32 and one of the second middle sipes 34 are arranged so as to form a continuous single sipe through the second crown main groove 4. That is, one of the second crown sipes 32 and one of the second middle sipes 34 are connected smoothly through the second crown main groove 4. On the other hand, each of the second middle sipes 34 is connected to each of the second shoulder sipes 36 so as to form a continuous single sipe through the second shoulder main groove 6. Thus, uneven wear may further be suppressed since the rigidity and ground contact pressure of the land portions 10, 12 and 14 may be optimized by the sipes 32, 34 and 36, e.g., the respective rigidity of the land portions 10, 12 and 14 and the ground contact pressure thereof are distributed in a well-balanced manner. Furthermore, steering stability of the pneumatic tire can be improved with improved transient characteristic when cornering.

The first crown sipes 31 are arranged so as to be continuous smoothly to some of the second middle sipes 34 through the second crown main groove 4 and a part of the crown land portion 10. Thus, uneven wear may further be suppressed since the rigidity and ground contact pressure of the land portions 13, 11, 10, 12 and 14 may be optimized, e.g., the respective rigidity of the land portions 13, 11, 10, 12 and 14 and the ground contact pressure thereof are distributed in a well-balanced manner. Furthermore, steering stability of the pneumatic tire can be improved with improved transient characteristic when cornering.

The second crown sipes 32 extend from the second crown main groove 4 in the second tread-half region 22 and termite within the crown land portion 10 without reaching the tire equator C. The second crown sipes 32, in cooperation with the first crown sipes 31, may ensure an excellent edge effect on the crown land portion 10 in the second tread-half region 22 and suppress reduction in rigidity of the crown land portion 10 so that uneven wear resistance can further be improved.

Preferably, the lengths L4 of the second crown sipes 32 are in a range of from 20% to 40% of the width W2 of the second crown main groove 4. When the lengths L4 are less than 20% of the width W2, there may be a possibility that the wet performance cannot be improved sufficiently due to insufficient edge effect of the second crown sipes 32. On the other hand, when the lengths L4 are more than 40% of the widths W2, the uneven wear resistance may be affected due to reduction in rigidity of the crown land portion 10.

Preferably, the lengths L4 of the second crown sipes 32 are less than 25% of the axial width of the crown land portion 10. When the lengths L4 are more than 25% of the axial width of the crown land portion 10, the uneven wear resistance may be affected due to lack of rigidity of the crown land portion 10.

The lengths L5 of the second middle sipes 34 are greater than the lengths L4 of the second crown sipes 32. The lengths L6 of the second shoulder sipes 36 are smaller than the lengths L5 of the second middle sipes 34. By the second crown sipes 32, the second middle sipes 34 and the second shoulder sipes 36, each of the crown land portion 10, the second middle land portion 12 and the second shoulder land portion 14 are optimized in rigidity to further improve uneven wear resistance.

Preferably, the lengths L6 of the second shoulder sipes 36 are set in a range of from 50% to 55% of the axial width of the second shoulder land portion 14. When the lengths L6 are less than 50% of the axial width of the second shoulder land portion 14, wet performance of the tire may be affected due to lack of edge effect by the second shoulder sipes 36. On the other hand, the lengths L6 are more than 55% of the axial width of the second shoulder land portion 14, uneven wear resistance of the tire may be affected due to lack of rigidity of the second shoulder land portion 14.

As illustrated in FIG. 3, the first shoulder land portion 13 is provided with a plurality of first shoulder lug grooves 41 extending axially inwardly from the first tread edge Te1. By the first shoulder lug grooves 41, drainage performance of the first shoulder land portion 13 can be improved. The first shoulder lug grooves 41 may extend axially outwardly beyond the first tread edge Te1. Preferably, the widths of the first shoulder lug grooves 41 are more than 2 mm. The first shoulder lug grooves 41 as configured above may further improve the wet performance of the pneumatic tire.

Referring to FIG. 1, the first shoulder lug grooves 41 terminate within the first shoulder land portion 13 without reaching the first shoulder main groove 5. This configuration may suppress reduction in the circumferential rigidity of the first shoulder land portion 13 to further improve uneven wear resistance. The first shoulder lug grooves 41 and the first shoulder sipes 35 are arranged alternately in the tire circumferential direction of the tire. Thus, rigidity distribution of the first shoulder land portion 13 may be uniformized, thereby uneven wear resistance improves.

The first shoulder lug grooves 41 include straight portions 41a extending in a straight manner from the first tread edge Te1 with an inclination of 85 to 95 degrees with respect to the tire circumferential direction and curved portions 41b extending in a circular arc manner along the first shoulder sipes 35. The straight portions 41a may improve wet performance when cornering, and the curved portions 41b may improve the transient characteristic when cornering.

As illustrated in FIG. 4, the second shoulder land portion 14 is provided with a plurality of second shoulder lug grooves 42 extending axially inwardly from the second tread edge Te2. By the second shoulder lug grooves 42, wet performance of the second shoulder land portions 14 can be improved. The second shoulder lug grooves 42 extend axially outwardly beyond the second tread edge Te2. Preferably, the widths of the second shoulder lug grooves 42 are more than 2 mm. By the second shoulder lug grooves 42 as described above, wet performance of the tire can further be improved.

The second shoulder lug grooves 42 terminate within the second shoulder land portions 14 without reaching the second shoulder main grooves 6. The second shoulder lug grooves 42 as such may suppress reduction in the circumferential rigidity of the second shoulder land portion 14 to further improve uneven wear resistance of the tire. The second shoulder lug grooves 42 and the second shoulder sipes 36 are arranged alternately in the tire circumferential direction. Thus, rigidity distribution of the second shoulder land portion 14 can be uniformized to further improve uneven wear resistance of the tire.

Referring to FIG. 1, the second shoulder lug grooves 42 include straight portions 42a extending in a straight manner from the second tread edge Te2 with an inclination of 85 to 95 degrees with respect to the tire circumferential direction and curved portions 42b extending in a circular arc manner along the second shoulder sipes 36. The straight portions 42a may improve wet performance when cornering, and the curved portions 42b may improve the transient characteristic when cornering.

Referring to FIG. 4, in this embodiment, the second middle land portion 12 is provided with a plurality of third middle sipes 38i extending axially outwardly from the second crown main groove 4 and a plurality of fourth middle sipes 38o extending axially inwardly from the second shoulder main groove 6.

The widths of the third middle sipes 38i and the fourth middle sipes 38o are less than 2 mm. The third middle sipes 38i and the fourth middle sipes 38o may improve wet performance of the pneumatic tire by the edge effect.

The third middle sipes 38i terminate within the second middle land portions 12 without reaching the second shoulder main groove 6. The fourth middle sipes 38o terminate within the second middle land portion 12 without reaching the second crown main groove 4. Preferably, the axial lengths of the third middle sipes 38i and the fourth middle sipes 38o are in a range of from 50% to 80% of the axial width of the second middle land portion 12. The third middle sipes 38i and the fourth middle sipes 38o are arranged alternately in the tire circumferential direction in such a manner that one second middle ripe 34 is arranged therebetween. Due to the third middle sipes 38i and the fourth middle sipes 38o, sufficient edge effect may be obtained and reduction in rigidity of the second middle land portions 12 may be suppressed, thereby improving uneven wear resistance.

Preferably, the ratio W4/W2 of the width W4 of the second shoulder main groove 6 to the width W2 of the second crown main groove 4 is in a rage of from 0.10 to 0.60. When the ratio W4/W2 is less than 0.10, drainage performance of the second shoulder main groove 6 may be affected, and the uneven wear resistance may be affected since rubber volume of the crown land portion 10 as well as the second middle land portion 12 may lack. When the ratio W4/W2 is more than 0.60, drainage performance of the second crown main groove 4 may be affected, and the uneven wear resistance may be affected since rubber volume of the second middle land portion 12 and the second shoulder land portion 14 may lack.

Preferably, the ratio W3/W1 of the width W3 of the first shoulder main groove 5 to the width W3 of the first crown main groove 3 is in a range of from 0.80 to 1.00. When the ratio W3/W1 is less than 0.80, drainage performance of the first shoulder main groove 5 may be affected, and the uneven wear resistance mat be affected since rubber volume of the crown land portion 10 and the first middle land portion 11 may lack. When the ratio W3/W1 is more than 1.00, drainage performance of the first crown main groove 3 may be affected, and the uneven wear resistance may be affected since rubber volume of the first middle land portion 11 and the first shoulder land portion 13 may lack.

Preferably, the ratio W3/W4 of the width W3 of the first shoulder main groove 5 to the width W4 of the second shoulder main groove 6 is in a range of from 1.40 to 1.60. When the ratio W3/W4 is less than 1.40, drainage performance of the first shoulder main groove 5 may be affected, and the uneven wear resistance may be affected since rubber volume of the second middle land portion 12 as well as the second shoulder land portion 14 may lack. When the ratio W3/W4 is more than 1.60, drainage performance of the second shoulder main groove 6 may be affected, and the uneven wear resistance may be affected since rubber volume of the first middle land portion 11 and the first shoulder land portion 13 may lack.

Preferably, the differences R5−R4 between the radiuses R5 of curvature of the second shoulder sipes 36 and the radiuses R4 of curvature of the second middle sipes 34 are smaller than the differences R3−R2 between the radiuses R3 of the first shoulder sipes 35 and the radiuses R2 of curvature of the first middle sipes 33. In the second tread-half region 22 on which a large load is to be acted when cornering, by setting the differences R5−R4 of radiuses of curvature to small, the steering stability can be improved with an improved transient characteristic when cornering.

In FIG. 3, the angles θ1 of the ends of the first middle sipes 33 at the first shoulder main groove 5 are preferably in a range of from 71 to 78 degrees with respect to the tire circumferential direction. When the angles θ1 are less than 71 degrees, steering stability of the tire may be affected due to lack of axial rigidity of the first middle land portion 11. When the angles θ1 are more than 78 degrees, there is a possibility that heel and toe wear occurs on the first middle land portion 11. Similarly, in FIG. 4, the angles θ2 of the ends of the second middle sipes 34 at the second shoulder main grooves 6 are preferably in a range of from 73 to 80 degrees. Further, in order to suppress heel and toe wear on the first middle land portion 11, the angles θ1 are preferably set smaller than the angles θ2.

In FIG. 3, the angles θ3 of the ends of the first shoulder sipes 35 at the first shoulder main groove 5 are preferably in a range of from 71 to 78 degrees with respect to the tire circumferential direction. When the angles θ3 are less than 71 degrees, the steering stability may be affected due to lack of axial rigidity of the first shoulder land portion 13. When the angles θ3 are more than 78 degrees, there is a possibility that heel and toe wear occurs on the first shoulder land portion 13. Similarly, in FIG. 4, the angles θ4 of the ends of the second shoulder sipes 36 at the second shoulder main groove 6 are preferably in a range of from 73 to 80 degrees with respect to the tire circumferential direction. Further, in order to suppress heel and toe wear on the first shoulder land portion 13, the angles θ3 are preferably set smaller than the angles θ4.

As illustrated in FIGS. 3 and 4, the crown land portion 10 is preferably provided with first crown shallow grooves 51 and second crown shallow grooves 52 each of which has a width less than 2 mm. Preferably, the depths of the first crown shallow grooves 51 and the second crown shallow grooves 52 are in a range of less than 2 mm. The first crown shallow grooves 51 are arranged so as to overlay the first crown sipes 31 at least partially and extend along the first crown sipes 31. In other words, the first crown sipes 31 are formed so as to extend inwardly from bottoms of the first crown shallow grooves 51 in a thickness direction of the tread portion 2. The relation between the second crown shallow grooves 52 and the second crown sipes 32 is the same as the above relation between the first crown shallow grooves 51 and the first crown sipes 31.

Since the crown land portion 10 is provided with the first crown shallow grooves 51 and the second crown shallow grooves 52, drainage performance of the crown land portion 10 can be improved so that wet performance improves. Further, since the widths as well as the depths of the first crown shallow grooves 51 and the second crown shallow grooves 52 are less than 2 mm, an impact on uneven wear resistance is restrictive. Note that the edge effect of the first crown sipes 31 and the second crown sipes 32 would be expected after the first crown shallow grooves 51 and the second crown shallow grooves 52 disappear with wearing of the crown land portion 10.

Preferably, the first middle land portion 11 is provided with first middle shallow grooves 53 each having a width less than 2 mm. Similarly, the second middle land portion 12 is preferably provided with second middle shallow grooves 54, third middle shallow grooves 58*i* and fourth middle shallow grooves 58*o* each of which has a width less than 2 mm. Preferably, the depths of the first middle shallow grooves 53, the second middle shallow grooves 54, the third middle shallow grooves 58*i* and the fourth middle shallow grooves 58*o* are less than 2 mm. The first middle shallow grooves 53 are arranged so as to overlay the first middle sipes 33 at least partially and extend along the first middle sipes 33. In other words, the first middle sipes 33 are formed so as to extend inwardly from bottoms of the first middle shallow groove 53 in the thickness direction of the tread portion 2. The relation between the second middle shallow grooves 54 and the second middle sipes 34, the relation between the third middle shallow grooves 58*i* and the third middle sipes 38*i*, and the relation between the fourth middle shallow grooves 58*o* and the fourth middle sipes 38*o* are the same as the relation between the first middle shallow grooves 53 and the first middle sipes 33 as described above.

Since the first middle land portion 11 and the second middle land portion 12 are respectively provided with the first middle shallow grooves 53 and the second middle shallow grooves 54, drainage performance of the first middle land portion 11 as well as the second middle land portion 12 can be improved so that the wet performance of the tire improves. Further, since the widths and the depths of the first middle shallow grooves 53, the second middle shallow grooves 54, the third middle shallow grooves 58*i* and the fourth middle shallow grooves 58*o* are less than 2 mm, an impact on uneven wear resistance is restrictive. Note that the edge effect of the first middle sipes 33, the second middle sipes 34, the third middle sipes 38*i* and the fourth middle sipes 38*o* would be expected after the first middle shallow grooves 53, the second middle shallow grooves 54, the third middle shallow grooves 58*i* and the fourth middle shallow grooves 58*o* disappear with wearing of the first and second middle land portions 11 and 12.

Preferably, the first shoulder land portion 13 is provided with first shoulder shallow grooves 55 having widths of less than 2 mm, and the second shoulder land portion 14 is provided with second shoulder shallow grooves 56 having widths less than 2 mm. Preferably, the depths of the first shoulder shallow grooves 55 and the second shoulder shallow grooves 56 are less than 2 mm. The first shoulder shallow grooves 55 are arranged so as to overlay the first shoulder sipes 35 at least partially and extend along the first shoulder sipes 35. In other words, the first shoulder sipes 35 are formed so as to extend inwardly from bottoms of the first shoulder shallow grooves 55 in the thickness direction of the tread portion 2. The relation between the second shoulder shallow grooves 56 and the second shoulder sipes 36 is the same as the relation between the first shoulder shallow grooves 55 and the first shoulder sipes 35 as described above.

Since the first shoulder land portion 13 is provided with the first shoulder shallow grooves 55 and the second shoulder land portion 14 is provided with the second shoulder shallow grooves 56, drainage performance of the first shoulder land portion 13 and the second shoulder land portion 14 can be improved so that the wet performance of the tire improves. Further, since the widths and the depths of the first shoulder shallow grooves 55 and the second shoulder shallow grooves 56 are less than 2 mm, an impact on uneven wear resistance is restrictive. Note that the edge effect of the first shoulder sipes 35 and the second shoulder sipes 36 would be expected after the first shoulder shallow grooves 55 and the second shoulder shallow grooves 56 disappear with wearing of the first shoulder land portion 13 and the second shoulder land portion 14.

As illustrated in FIG. 3, an arc-shaped chamfered portion 61 is provided on a location of the crown land portion 10 where each of the first crown shallow grooves 51 is in communication with the first crown main groove 3. Specifically, the chamfered portion 61 is formed at the corner of the crown land portion 10 where each of the first crown shallow grooves 51 intersects with the first crown main groove 3 at an acute angle. The chamfered portion 61 may improve drainage performance of the first crown shallow grooves 51.

An arc-shaped chamfered portion 63 is provided on a location of the first middle land portion 11 where each of the first middle shallow grooves 53 is in communication with the first crown main groove 3. Specifically, the chamfered portion 63 is formed on the corner where each of the first middle shallow grooves 53 intersects with the first crown main groove 3 at an acute angle. Further, an arc-shaped chamfered portion 65 is provided on a location of the first middle land portion 11 where each of the first middle shallow grooves 53 is in communication with the first shoulder main groove 5. Specifically, the chamfered portion 65 is formed on the corner where each of the first middle shallow grooves 53 intersects with the first shoulder main groove 5 at an acute angle. These chamfered portions 63 and 65 may improve drainage performance of the first middle shallow grooves 53.

An arc-shaped chamfered portion 67 is provided on a location of the first shoulder land portion 13 where each of the first shoulder shallow grooves 55 is in communication with the first shoulder main groove 5. Specifically, the chamfered portion 67 is formed on the corner where each of the first shoulder shallow grooves 55 intersects with the first shoulder main groove 5 at an acute angle. The chamfered portion 67 may improve drainage performance of the first shoulder shallow grooves 55.

As illustrated in FIG. 4, an arc-shaped chamfered portion 72 is provided on a location of the second middle land portion 12 where each of the second middle shallow grooves 54 is in communication with the second crown main groove 4. Specifically, the chamfered portion 72 is formed on the corner where each of the second middle shallow grooves 54 intersects with the second crown main grooves 4 at an acute angle. Similarly, an arc-shaped chamfered portion 74 is provided on a location of the second middle land portion 12 where each of the second middle shallow grooves 54 is in communication with the second shoulder main groove 6. Specifically, the chamfered portion 74 is formed on the corner where each of the second middle shallow grooves 54 intersects with the second shoulder main groove 6 at an acute angle. These chamfered portions 72 and 74 may improve drainage performance of the second middle shallow grooves 54.

An arc-shaped chamfered portion 78*i* is provided on a location of the second middle land portion 12 where each of the third middle shallow grooves 58*i* is in communication with the second crown main groove 4. Specifically, the chamfered portion 78*i* is formed on the corner where each of the third middle shallow grooves 58*i* intersects with the second crown main groove 4 at an acute angle. Similarly, an arc-shaped chamfered portion 78*o* is provided on a location of the second middle land portion 12 where each of the fourth middle shallow grooves 58*o* is in communication with the second shoulder main groove 6. Specifically, the chamfered portion 78*o* is formed on the corner where each of the fourth middle shallow grooves 58*o* intersects with the second shoulder main groove 6 at an acute angle. The chamfered portions 78*i* and 78*o* may improve drainage performance of the third middle shallow grooves 58*i* and the fourth middle shallow grooves 58*0*.

An arc-shaped chamfered portion 76 is provided on the second shoulder land portion 14 where each of the second shoulder shallow grooves 56 is in communication with the second shoulder main groove 6. Specifically, the chamfered portion 76 is formed on the corner where each of the second shoulder shallow grooves 56 intersects with the second shoulder main groove 6 at an acute angle. The chamfered portion 76 may improve drainage performance of the second shoulder shallow groove 56.

Figure 5:
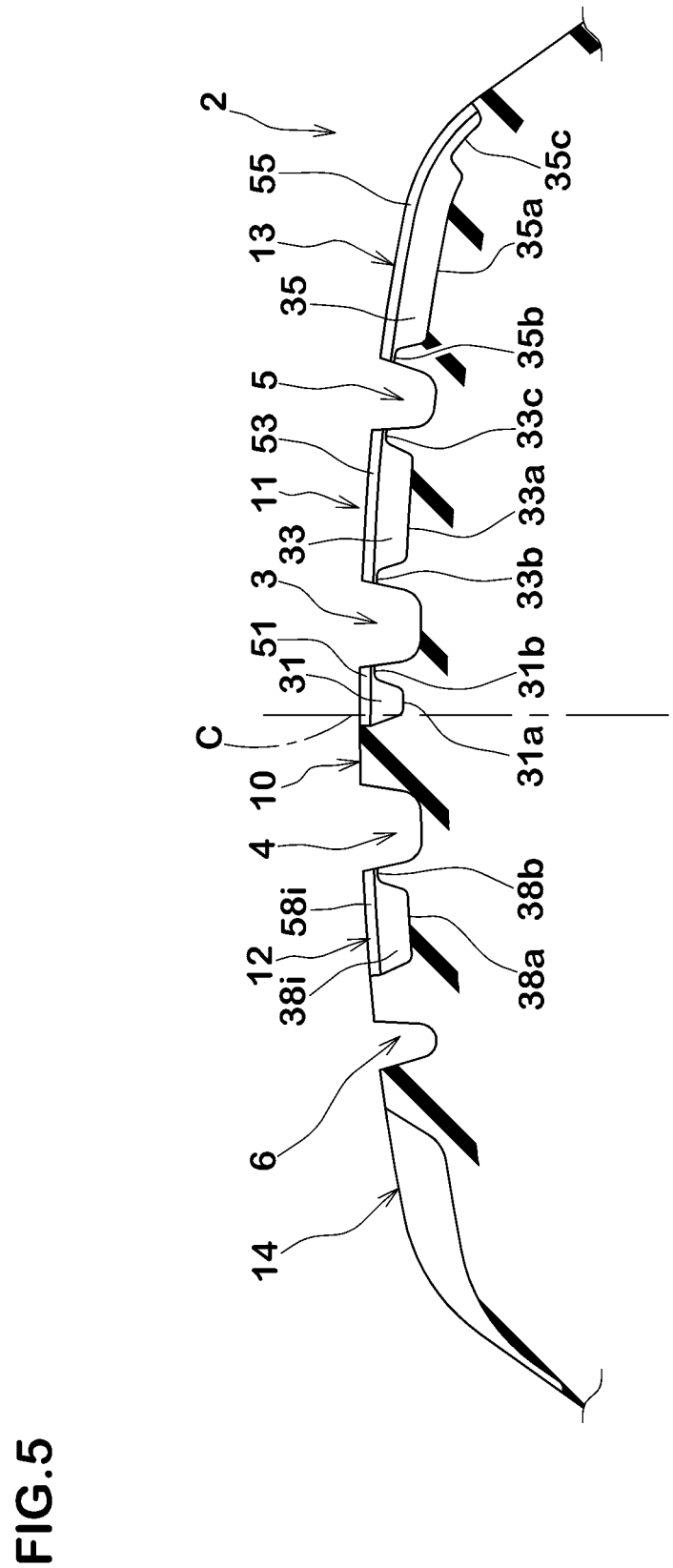
FIG. 5 is a sectional view of the tread portion taken along a line B-B of FIG. 1.

FIG. 5 illustrates a sectional view of the tread portion 2 taken along a line B-B of FIG. 1. The first crown sipes 31, the first middle sipes 33 and the first shoulder sipes 35 vary in depth along the tire axial direction.

Each of the first crown sipes 31 includes a deep-bottom portion 31*a* on a middle area of the crown land portion 10 and a shallow-bottom portion 31*b* on the side of the first crown main groove 3. The depth of the first crown sipe 31 varies linearly between the deep-bottom portion 31*a* and the shallow-bottom portion 31*b*. Due to the shallow-bottom portion 31*b*, circumferential rigidity of the crown land portion 10 can be enhanced, thereby suppressing uneven wear such as heel and toe wear. On the other hand, the deep-bottom portion 31*a* may maintain an excellent wet performance since it can remain on the middle area of the crown land portion 10 at a middle and final stages of wearing.

Each of the first middle sipes 33 includes a deep-bottom portion 33*a* on a middle area of the first middle land portion 11, a shallow-bottom portion 33*b* on the side of the first crown main groove 3 and a shallow-bottom portion 33*c* on the side of the first shoulder main groove 5. The depth of the first middle sipe 33 varies linearly between the deep-bottom portion 33*a* and the shallow-bottom portion 33*b*, and between the deep-bottom portion 33*a* and the shallow-bottom portion 33*c*. Due to the shallow-bottom portions 33*b* and 33*c*, circumferential rigidity of the first middle land portion 11 can be enhanced, thereby suppressing uneven wear such as heel and toe wear. On the other hand, the deep-bottom portion 33*a* may maintain an excellent wet performance since it can remain on the middle area of the first middle land portion 11 at a middle and final stages of wearing.

Each of the first shoulder sipes 35 includes a deep-bottom portion 35*a* on a middle area of the first shoulder land portion 13, a shallow-bottom portion 35*b* on the side of the first shoulder main groove 5 and a shallow-bottom portion 35*c* arranged at axially outward of the first tread edge Te1. The depth of the first shoulder sipe 35 varies linearly between the deep-bottom portion 35*a* and the shallow-bottom portion 35*b* as well as between the deep-bottom portion 35a and the shallow-bottom portion 35c. Due to the shallow-bottom portions 35b and 35c, circumferential rigidity of the first shoulder land portion 13 can be enhanced, thereby suppressing uneven wear such as heel and toe wear. On the other hand, the deep-bottom portion 35a may maintain an excellent wet performance since it can remain on the middle area of the first shoulder land portion 13 at a middle and final stages of wearing.

Figure 6:
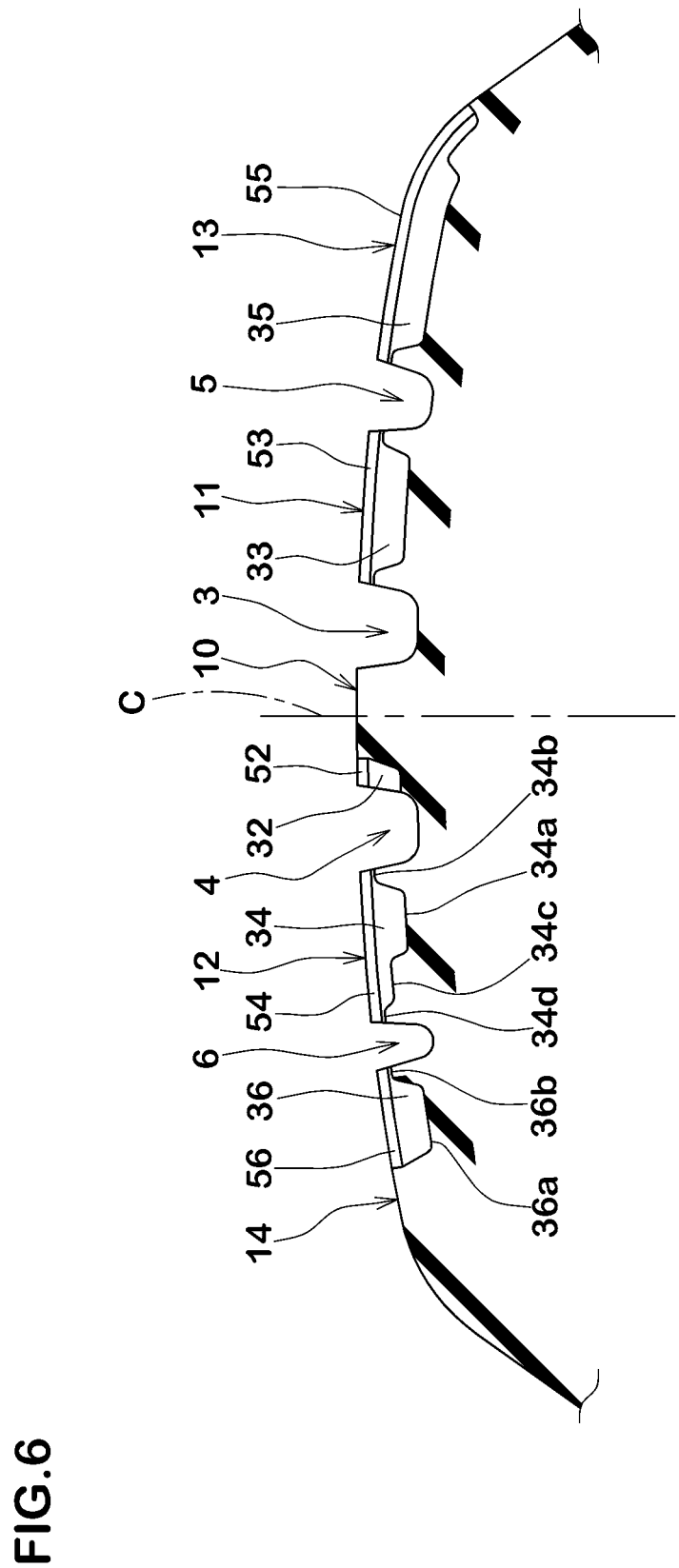
FIG. 6 is a sectional view of the tread portion taken along a line C-C of FIG. 1.

FIG. 6 illustrates a sectional view of the tread portion 2 taken along a line C-C of FIG. 1. Each of the second middle sipes 34 and the second shoulder sipes 36 varies in depth along the tire axial direction.

Each of the second middle sipes 34 includes a deep-bottom portion 34a on a middle area of the second middle land portion 12, a shallow-bottom portion 34b on the side of the second crown main groove 4, and shallow-bottom portions 34c and 34d on the side of the second shoulder main groove 6. The depth of the shallow-bottom portion 34c is greater than the depth of the shallow-bottom portion 34d. The depth of the second middle sipe 34 varies linearly between the deep-bottom portion 34a and the shallow-bottom portions 34b and 34c as well as between the shallow-bottom portion 34c and the shallow-bottom portion 34d. Due to the shallow-bottom portions 34b, 34c and 34d, circumferential rigidity of the second middle land portion 12 can be enhanced, thereby suppressing uneven wear such as heel and toe wear. Further, by providing the shallow-bottom portion 34c on the side of the second shoulder main grooves 6, since the depth of the second middle sipe 34 varies in stages, a circumferential rigidity of the second middle land portions 12 may distribute in stages, thereby improving transient characteristic of the tire when cornering. On the other hand, the deep-bottom portion 34a may maintain an excellent wet performance since it can remain on the middle area of the second middle land portion 12 at a middle and final stages of wearing.

Each of the second shoulder sipes 36 includes a deep-bottom portion 36a on the middle area of the second shoulder land portion 14 and a shallow-bottom portion 36b on the side of the second shoulder main grooves 6. The depth of the second shoulder sipe 36 varies linearly between the deep-bottom portion 36a and the shallow-bottom portion 36b. Due to the shallow-bottom portion 36b, circumferential rigidity of the second shoulder land portion 14 can be enhanced, thereby suppressing heel and toe wear. On the other hand, the deep-bottom portion 36a may maintain an excellent wet performance since it can remain on the middle area of the second shoulder land portion 14 at a middle and final stages of wearing.

As illustrated in FIG. 5, each of the third middle sipes 38i varies in depth along the tire axial direction. The third middle sipe 38i includes a deep-bottom portion 38a on the middle area of the second middle land portion 12 and a shallow-bottom portion 38b on the side of the second crown main groove 4. The depth of the third middle sipe 38i varies linearly between the deep-bottom portion 38a and the shallow-bottom portion 38b. Due to the shallow-bottom portion 38b, circumferential rigidity of the second middle land portion 12 can be enhanced thereby suppressing heel and toe wear. On the other hand, the deep-bottom portion 38a may maintain an excellent wet performance since it can remain on the second middle land portions 12 at a middle and final stages of wearing.

As illustrated in FIG. 2, each of the fourth middle sipes 38o varies in depth along the tire axial direction. Each of the fourth middle sipes 38o includes a deep-bottom portion 38c on a middle area of the second middle land portion 12 and a shallow-bottom portion 38d on the side of the second shoulder main groove 6. The depth of the fourth middle sipe 38o varies linearly between the deep-bottom portion 38c and the shallow-bottom portion 38d. Due to the shallow-bottom portion 38d, circumferential rigidity of the second middle land portion 12 can be enhanced, thereby suppressing heel and toe wear. On the other hand, the deep-bottom portion 38c may maintain an excellent wet performance since it can remain at the middle area of the second middle land portion 12 at a middle and final stages of wearing.

As illustrated in FIGS. 1, 3 and 5, it is preferable that the distance from the tire equator C to the groove centerline of the first crown main groove 3 is smaller than the distance from the tire equator C to the groove centerline of the second crown main groove 4. It is also preferable that the distance from the tire equator C to the groove centerline of the first shoulder main groove 5 is smaller than the distance from the tire equator C to the groove centerline of the second shoulder main groove 6. As a result, the groove centerline of the crown land portion 10 is located within the second tread-half region 22, and this configuration in cooperation with the first crown shallow grooves 51 may drain the water easily from under the crown land portion 10 to the first crown main groove 3 when traveling on wet road.

While the particularly preferable embodiments in accordance with the present invention have been described in detail, the present invention is not limited to the illustrated embodiments, but can be modified and carried out in various aspects.

EXAMPLES

Pneumatic tires 215/60R16 having the basic tread pattern as illustrated in FIG. 1 were manufactured based on the details shown in Table 1, and then wet performance and uneven wear resistance were tested. The test methods are as follows.

Wet Performance Test:

Each of the test tires mounted on a rim 16×7.0J with an internal pressure of 250 kPa was installed to an FF vehicle having a displacement of 2,500 cc as the all wheels, and then a driver evaluated its grip performance and steering response when driving the vehicle on an asphalt test road covered with a 5 mm deep water. The test results are shown in Table 1 using a score wherein the Ex. 1 is set to 100. The larger the score, the better the wet performance is.

Uneven Wear Resistance Test:

A test driver drove the above test vehicle on a dry asphalt road until either one of the four tires worn at 50% of its life. After traveling, the presence of uneven wear on each of the first middle land portion and the first shoulder land portion was checked through naked eyes of an observer. The test results are shown in Table 1 using a score wherein the Ex. 1 is set to 100. The larger the score, the better the uneven wear resistance is.

TABLE 1

|  | Ref. 1 | Ref. 2 | Ref. 3 | Ex. 1 | Ex. 2 | Ex. 3 | Ex. 4 |
| --- | --- | --- | --- | --- | --- | --- | --- |
| Widths of first crown sipes (mm) | 2 | 0.5 | 0.5 | 0.5 | 1 | 0.5 | 0.5 |
| Widths of first middle sipes (mm) | 2 | 0.5 | 0.5 | 0.5 | 1 | 0.5 | 0.5 |

TABLE 1-continued

| | Ref. 1 | Ref. 2 | Ref. 3 | Ex. 1 | Ex. 2 | Ex. 3 | Ex. 4 |
|---|---|---|---|---|---|---|---|
| Widths of first shoulder sipes (mm) | 2 | 0.5 | 0.5 | 0.5 | 1 | 0.5 | 0.5 |
| R1 (mm) | 55 | 75 | 60 | 55 | 55 | 60 | 55 |
| R2 (mm) | 60 | 60 | 60 | 60 | 60 | 60 | 75 |
| R3 (mm) | 75 | 55 | 60 | 75 | 75 | 75 | 75 |
| Wet performance (score) | 110 | 100 | 100 | 100 | 110 | 100 | 100 |
| Uneven wear resistance (score) | 70 | 80 | 85 | 100 | 85 | 95 | 95 |

As apparent from the test results as shown in Table 1, it was confirmed that the example pneumatic tires had improved the wet performance and the uneven wear resistance significantly as compared with the reference example tires.

What is claimed is:

1. A pneumatic tire comprising:
a tread portion provided with a pair of circumferentially and continuously extending crown main grooves arranged such that a tire equator is located therebetween, a pair of circumferentially and continuously shoulder main grooves arranged such that the crown main grooves are located therebetween, a crown land portion disposed between the crown main grooves, a pair of middle land portions each disposed between adjacent one of the crown main grooves and one of the shoulder main grooves on each side of the tire equator, and a pair of shoulder land portions disposed axially outward of the shoulder main grooves, wherein the tread portion comprises a first tread-half region from the tire equator to a first tread edge and a second tread-half region from the tire equator to a second tread edge located on an opposite side of the first tread edge;
in the first tread-half region, the crown land portion and the middle land portion being not provided with any grooves having widths equal to or more than 2 mm;
in the first tread-half region, the crown land portion, the middle land portion and the shoulder land portion being respectively provided with first crown sipes, first middle sipes and first shoulder sipes each having a width of less than 2 mm;
the first crown sipes, the first middle sipes and the first shoulder sipes respectively extending in arc shapes having radiuses R1, R2 and R3 of curvature to protrude toward a first circumferential direction side, wherein
the arc shape of the first crown sipes is a single radius circular arc, and
the radiuses R1, R2 and R3 satisfy the following relation:

R1≤R2≤R3, and R1<R3;

in the second tread-half region, the middle land portion being provided with second middle sipes each having a width of less than 2 mm; and
in the second tread-half region, the shoulder land portion being provided with
second shoulder lug grooves extending axially inwardly from the second tread edge and having a width of more than 2 mm, and
second shoulder sipes extending in the tire axial direction from the shoulder main groove toward the second tread edge, wherein lengths of the second shoulder sipes are smaller than lengths of the second middle sipes.

2. The pneumatic tire according to claim 1,
wherein the first crown sipes extend from the crown main groove in the first tread-half region beyond the tire equator and terminate at terminal ends thereof without reaching the other one of the crown main grooves, and the terminal ends of the first crown sipes are not connected to any other grooves or sipes.

3. The pneumatic tire according to claim 2, wherein a length L1 of the first crown sipes is in a range of from 70% to 100% of a width of the crown main groove on the first tread-half region.

4. The pneumatic tire according to claim 1,
wherein respective lengths L1, L2 and L3 of the first crown sipes, the first middle sipes and the first shoulder sipes satisfy the following relation:

L1<L2<L3.

5. The pneumatic tire according to claim 1, wherein
in the second tread-half region, the crown land portion is provided with a second crown sipe having a width of less than 2 mm,
the second crown sipe extends from the crown main groove in the second tread-half region and terminates at a terminal end thereof without reaching the tire equator, and
the terminal end of the second crown sipe is not connected to any other grooves or sipes.

6. The pneumatic tire according to claim 5, wherein
the second middle sipes and the second shoulder sipes respectively extend in arc shapes having radiuses R4 and R5 of curvature to protrude toward a second circumferential direction side, wherein the radiuses R4 and R5 satisfy the following relation:

R4<R5.

7. The pneumatic tire according to claim 6, wherein
the second shoulder sipes terminate at terminal ends thereof without reaching the second tread edge, and
the terminal ends of the second shoulder sipes are not connected to any other grooves or sipes.

8. The pneumatic tire according to claim 1, wherein
in the first tread-half region, the shoulder land portion is provided with a first shoulder lug groove extending axially inwardly from the first tread edge and terminating at a terminal end thereof without reaching the shoulder main groove,
the terminal end of the first shoulder lug groove is not connected to any other grooves or sipes, and
the first shoulder lug groove comprises
a straight portion extending in a straight manner from the first tread edge at an angle of 85 to 95 degrees with respect to a tire circumferential direction and
a curved portion extending in an arc manner and being parallel to the first shoulder sipes.

9. The pneumatic tire according to claim 1, wherein
the second shoulder lug grooves terminate at terminal ends thereof without reaching the shoulder main groove,
the terminal ends of the second shoulder lug grooves are not connected to any other grooves nor sipes, and
the second shoulder lug grooves each comprise
a straight portion extending in a straight manner from the second tread edge at an angle of 85 to 95 degrees with respect to a tire circumferential direction and a curved portion extending in an arc manner along and being parallel to the second shoulder sipes.

10. The pneumatic tire according to claim 1, wherein the radiuses R1, R2 and R3 satisfy the following relation:

$$R1 \leq R2 \leq R3, \text{ and } R2 < R3.$$

11. A pneumatic tire comprising:
a tread portion provided with a pair of circumferentially and continuously extending crown main grooves arranged such that a tire equator is located therebetween, a pair of circumferentially and continuously shoulder main grooves arranged such that the crown main grooves are located therebetween, a crown land portion disposed between the crown main grooves, a pair of middle land portions each disposed between adjacent one of the crown main grooves and one of the shoulder main grooves on each side of the tire equator, and a pair of shoulder land portions disposed axially outward of the shoulder main grooves,
wherein
the tread portion comprises a first tread-half region from the tire equator to a first tread edge and a second tread-half region from the tire equator to a second tread edge located on an opposite side of the first tread edge;
in the first tread-half region, the crown land portion and the middle land portion being not provided with any grooves having widths equal to or more than 2 mm;
in the first tread-half region, the crown land portion, the middle land portion and the shoulder land portion being respectively provided with first crown sipes, first middle sipes and first shoulder sipes each having a width of less than 2 mm; and
the first crown sipes, the first middle sipes and the first shoulder sipes respectively extending in arc shapes having radiuses R1, R2 and R3 of curvature to protrude toward a first circumferential direction side, wherein the radiuses R1, R2 and R3 satisfy the following relation:

$$R1 \leq R2 \leq R3, \text{ and } R2 < R3;$$

in the second tread-half region, the middle land portion being provided with second middle sipes each having a width of less than 2 mm; and
in the second tread-half region, the shoulder land portion being provided with
second shoulder lug grooves extending axially inwardly from the second tread edge and having a width of more than 2 mm, and
second shoulder sipes extending in the tire axial direction from the shoulder main groove toward the second tread edge, wherein lengths of the second shoulder sipes are smaller than lengths of the second middle sipes.

12. The pneumatic tire according to claim 11, wherein
the first crown sipes extend from the crown main groove in the first tread-half region beyond the tire equator and terminate at terminal ends thereof without reaching the other one of the crown main grooves, and
the terminal ends of the first crown sipes are not connected to any other grooves or sipes.

13. The pneumatic tire according to claim 11, wherein respective lengths L1, L2 and L3 of the first crown sipes, the first middle sipes and the first shoulder sipes satisfy the following relation:

$$L1 < L2 < L3.$$

14. The pneumatic tire according to claim 11, wherein
in the second tread-half region, the crown land portion is provided with a second crown sipe having a width of less than 2 mm,
the second crown sipe extends from the crown main groove in the second tread-half region and terminates at a terminal end thereof without reaching the tire equator, and
the terminal end of the second crown sipe is not connected to any other grooves or sipes.

15. The pneumatic tire according to claim 14, wherein
the second middle sipes and the second shoulder sipes respectively extend in arc shapes having radiuses R4 and R5 of curvature to protrude toward a second circumferential direction side, wherein the radiuses R4 and R5 satisfy the following relation:

$$R4 < R5.$$

16. The pneumatic tire according to claim 15, wherein
the second shoulder sipes terminate at terminal ends thereof without reaching the second tread edge, and
the terminal ends of the second shoulder sipes are not connected to any other grooves or sipes.

17. The pneumatic tire according to claim 11, wherein
in the first tread-half region, the shoulder land portion is provided with a first shoulder lug groove extending axially inwardly from the first tread edge and terminating at a terminal end thereof without reaching the shoulder main groove,
the terminal end of the first shoulder lug groove is not connected to any other grooves nor sipes, and
the first shoulder lug groove comprises
a straight portion extending in a straight manner from the first tread edge at an angle of 85 to 95 degrees with respect to a tire circumferential direction and
a curved portion extending in an arc manner and being parallel to the first shoulder sipes.

18. The pneumatic tire according to claim 11, wherein
the second shoulder lug grooves terminate at terminal ends thereof without reaching the shoulder main groove,
the terminal ends of the second shoulder lug grooves are not connected to any other grooves nor sipes, and
the second shoulder lug grooves each comprise
a straight portion extending in a straight manner from the second tread edge at an angle of 85 to 95 degrees with respect to a tire circumferential direction and
a curved portion extending in an arc manner and being parallel to the second shoulder sipes.

19. The pneumatic tire according to claim 11, wherein a length L1 of the first crown sipes is in a range of from 70% to 100% of a width of the crown main groove on the first tread-half region.

* * * * *